(12) United States Patent
Jia

(10) Patent No.: US 11,627,393 B2
(45) Date of Patent: Apr. 11, 2023

(54) SIDE-STRAP STRUCTURE FOR HEAD-MOUNTED DEVICE

(71) Applicant: Qingdao Pico Technology Co., Ltd., Qingdao (CN)

(72) Inventor: Wei Jia, Qingdao (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/882,953

(22) Filed: Aug. 8, 2022

(65) Prior Publication Data

US 2023/0007371 A1 Jan. 5, 2023

Related U.S. Application Data

(63) Continuation of application No. PCT/CN2021/137483, filed on Dec. 13, 2021.

(30) Foreign Application Priority Data

May 10, 2021 (CN) .......................... 202110503640.4

(51) Int. Cl.
   *H04R 1/02* (2006.01)
(52) U.S. Cl.
   CPC ..................................... *H04R 1/02* (2013.01)
(58) Field of Classification Search
   CPC ........ H04R 1/02; H04R 1/028; H04R 1/1066; H04R 1/1008; G02B 27/017;
   (Continued)

(56) References Cited

U.S. PATENT DOCUMENTS

| 10,178,457 B1 * | 1/2019 | Tao ........................ H04R 1/028 |
| 10,321,751 B1 * | 6/2019 | Magrath ............... G06F 1/1686 |

(Continued)

FOREIGN PATENT DOCUMENTS

| CN | 204989641 U | 1/2016 |
| CN | 206096625 U | 4/2017 |

(Continued)

OTHER PUBLICATIONS

Chinese First Office Action for application No. 202110503640.4 dated Jan. 29, 2022.

(Continued)

*Primary Examiner* — Jason R Kurr
(74) *Attorney, Agent, or Firm* — Moser Taboada

(57) ABSTRACT

A side-strap structure for a head-mounted device is disclosed. The side-strap structure comprises an outer strap shell, a strap, a middle strap shell, a bottom strap shell and a strap locker; the bottom strap shell is rotatably fixed to a main body of the head-mounted device through the strap locker, the middle strap shell is fixed between the outer strap shell and the bottom strap shell, and one end of the strap is fixed between the outer strap shell and the middle strap shell; and an accommodating slot for placing a loudspeaker is provided on an inner side of one end of the bottom strap shell, the middle strap shell is hermetically connected to the bottom strap shell after the loudspeaker is placed into the accommodating slot, and a sound emitting hole of the loudspeaker is provided on an outer side of the other end of the bottom strap shell. The side-strap structure according to the present disclosure does not only have the function of a strap for a head-mounted device, but also has the function of external sound playing. Moreover, it is compact in structure and small in volume.

9 Claims, 4 Drawing Sheets

(58) Field of Classification Search
CPC .......... G02B 27/0176; G02B 27/0149; G02B 27/2027; G02B 27/0154; G02B 2027/0161
See application file for complete search history.

(56) References Cited

U.S. PATENT DOCUMENTS

| | | | |
|---|---|---|---|
| 10,539,792 B1* | 1/2020 | Tompkins | G02B 27/0176 |
| 10,560,769 B2* | 2/2020 | Bristol | G02B 27/017 |
| 10,578,875 B1* | 3/2020 | Bristol | G02B 27/0176 |
| 2014/0123441 A1 | 5/2014 | Takagi et al. | |
| 2018/0059424 A1* | 3/2018 | Miller | H05K 999/99 |
| 2022/0159366 A1* | 5/2022 | Porter | H04R 7/18 |

FOREIGN PATENT DOCUMENTS

| | | |
|---|---|---|
| CN | 206930840 U | 1/2018 |
| CN | 207650712 U | 7/2018 |
| CN | 109001909 A | 12/2018 |
| CN | 208969341 U | 6/2019 |
| CN | 110944270 A | 3/2020 |
| CN | 210579200 U | 5/2020 |
| CN | 111650753 A | 9/2020 |
| CN | 211909167 U | 11/2020 |
| CN | 112433371 A | 3/2021 |
| CN | 113347409 A | 9/2021 |
| WO | WO-2020222334 A1 | 11/2020 |

OTHER PUBLICATIONS

International Search Report for application No. PCT/CN2021/137483, dated Mar. 9, 2022.

\* cited by examiner

SIDE-STRAP STRUCTURE FOR HEAD-MOUNTED DEVICE

CROSS-REFERENCE TO RELATED APPLICATIONS

This application is entered as a bypass continuation application under 35 U.S.C. § 111(a) of International Application No. PCT/CN2021/137483, filed on Dec. 13, 2021, which claims priority to Chinese Patent Application No. 202110503640.4, filed on May 10, 2021. The embodiment of the priority applications are hereby incorporated herein in their entirety by reference.

TECHNICAL FIELD

The present disclosure relates to the technical field of head-mounted devices, and in particular to a side-strap structure for a head-mounted device.

BACKGROUND

In order to realize the function of external sound playing of head-mounted devices, in general, external earphones are additionally provided, or integrated earphones are provided at the main body of the head-mounted device. Both of those methods are inconvenient to carry due to the volume problems, and increase the burden on the user's head due to the excessive volume and weight of the earphones, whereby the user experience is poor.

SUMMARY

In view of the above problems, the present disclosure discloses a side-strap structure for a head-mounted device to overcome the above problems or at least partially solve the above problems.

In order to achieve the above object, the present disclosure employs the following technical solutions.

A side-strap structure for a head-mounted device, comprising an outer strap shell, a strap, a middle strap shell, a bottom strap shell and a strap locker;

the bottom strap shell is rotatably fixed to a main body of the head-mounted device through the strap locker, the middle strap shell is fixed between the outer strap shell and the bottom strap shell, and one end of the strap is fixed between the outer strap shell and the middle strap shell; and an accommodating slot for placing a loudspeaker is provided on an inner side of one end of the bottom strap shell, the middle strap shell is hermetically connected to the bottom strap shell after the loudspeaker is placed into the accommodating slot, and a sound emitting hole of the loudspeaker is provided on an outer side of the other end of the bottom strap shell.

Optionally, a sound playing hole is provided at a periphery of the accommodating slot; and a filter mesh is provided inside the sound playing hole and/or the sound emitting hole.

Optionally, the accommodating slot is of an outwardly convex structure, and a bottom of the accommodating slot passes through a through hole on a side of the main body of the head-mounted device and is rotatably fixed to the strap locker.

Optionally, a cross section of the accommodating slot is circular and is for placing the loudspeaker having a circular circumference; and an inner wall of the accommodating slot is provided with a first anti-rotation slot, and the outer circumference of the loudspeaker is provided with a first anti-rotation projection matching with the first anti-rotation slot.

Optionally, a plurality of L-shaped rotary fixing grooves are evenly provided at an outer circumference of a bottom of the accommodating slot, and the strap locker is provided with rotation fixing blocks matching with the rotary fixing grooves.

Optionally, a plurality of second anti-rotation projections are provided at an outer circumference of the accommodating slot, and second anti-rotation slots matching with the second anti-rotation projections are provided at an outer edge of a through hole on a side of the main body of the head-mounted device.

Optionally, a gluing slot is provided at an outer edge of an inner side of the bottom strap shell, and a gluing rib is provided on one side of the middle strap shell that is closer to the bottom strap shell; and a plurality of fixing ribs are provided at an outer edge of the middle strap shell, and fixing grooves matching with the fixing ribs are provided on an inner side of the outer strap shell.

Optionally, both of one side of the middle strap shell that is closer to the bottom strap shell and one side of the outer strap shell that is closer to the middle strap shell are provided with a supporting structure.

Optionally, the outer strap shell, the middle strap shell and the bottom strap shell have oblong shapes with similar structures; and all of the outer strap shell, the middle strap shell and the bottom strap shell have a part curving towards the main body of the head-mounted device so as to make the sound emitting hole close to an ear of a user.

Optionally, an inner surface of the outer strap shell is provided with a screw column, and the strap is fixed to the outer strap shell by the screw column and a screw or bolt; and a plurality of screw holes are evenly provided at the strap locker, and the strap locker is fixedly connected to the main body of the head-mounted device by the screw holes and screws or bolts.

The advantages and beneficial effects of the present disclosure are as follows.

In the side-strap structure according to the present disclosure, one end of the strap is fixed between the outer strap shell and the middle strap shell, and the accommodating slot for placing the loudspeaker is provided on the inner side of one end of the bottom strap shell. After the loudspeaker is placed into the accommodating slot, the middle strap shell is hermetically connected to the bottom strap shell. The sound emitting hole of the loudspeaker is provided on the outer side of the other end of the bottom strap shell. Therefore, the side-strap structure does not only have the function of a strap for a head-mounted device, but also has the function of external sound playing. Moreover, it is compact in structure and small in volume.

BRIEF DESCRIPTION OF DRAWINGS

By reading the following detailed description of the preferable embodiments, various other advantages and benefits will become clear to a person skilled in the art. The drawings are merely intended to show the preferable embodiments, and are not to be considered as limiting the present disclosure. Furthermore, throughout the drawings, the same reference signs denote the same elements. In the drawings.

Figure 1:
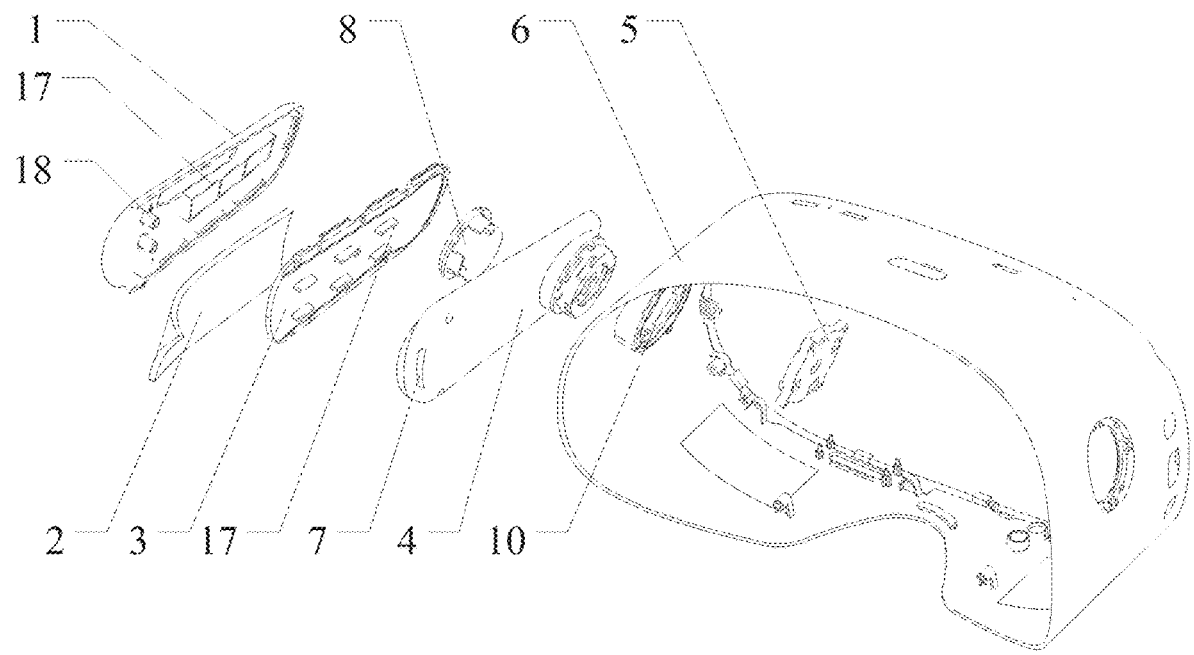
FIG. 1 is an exploded structural view of a side-strap structure according to an embodiment of the present disclosure.

In the drawings: 1. outer strap shell; 2. strap; 3. middle strap shell; 4. bottom strap shell; 5. strap locker; 6. main body of head-mounted device; 7. sound emitting hole; 8. loudspeaker; 9. sound playing hole; 10. through hole; 11. first anti-rotation projection; 12. rotary fixing groove; 13. second anti-rotation projection; 14. gluing rib; 15. fixing rib; 16. fixing groove; 17. supporting structure; 18. screw column; 19. screw hole; and 20. wire-harness hole.

DETAILED DESCRIPTION

In order to make the objects, the technical solutions and the advantages of the present disclosure clearer, the technical solutions of the present disclosure will be clearly and completely described below with reference to the particular embodiments and the corresponding drawings of the present disclosure. Apparently, the described embodiments are merely certain embodiments of the present disclosure, rather than all of the embodiments. All of the other embodiments that a person skilled in the art obtains on the basis of the embodiments in the present disclosure without paying creative work fall within the protection scope of the present disclosure.

The technical solutions provided by the embodiments of the present disclosure will be described in detail below with reference to the drawings.

Figure 3:
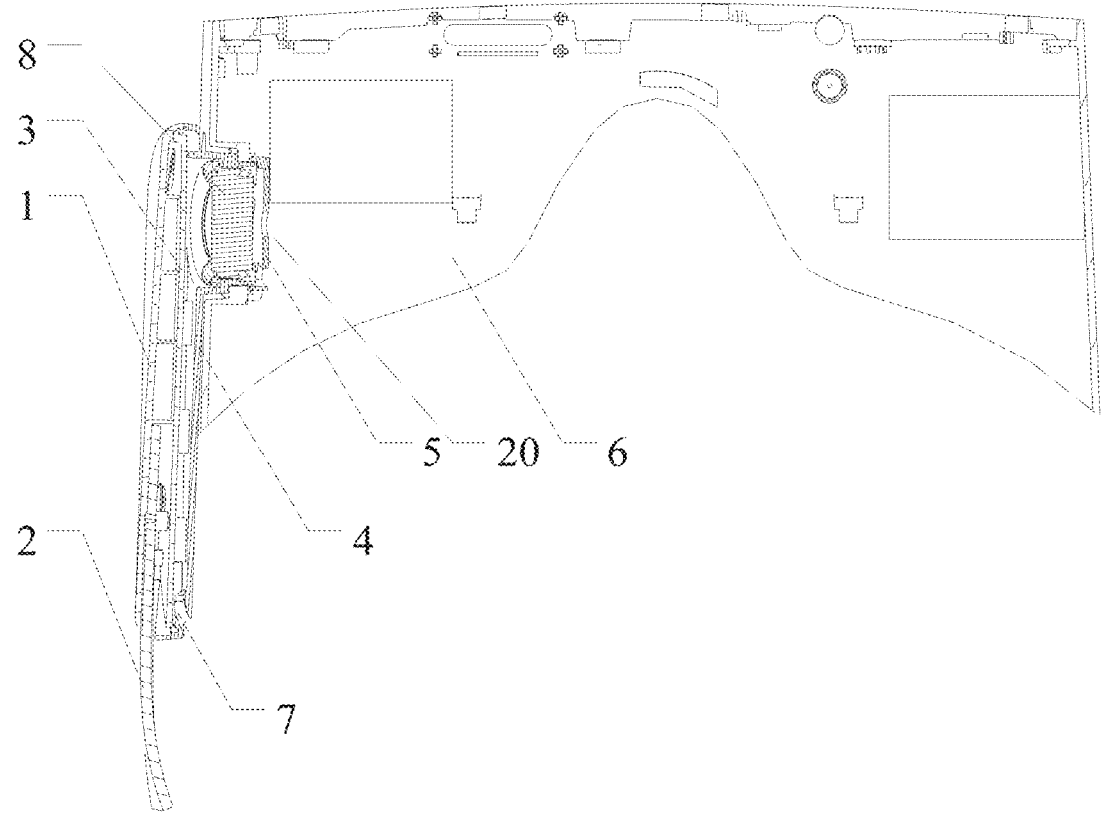
FIG. 3 is a sectional view of a side-strap structure according to an embodiment of the present disclosure.

An embodiment of the present disclosure discloses a side-strap structure for a head-mounted device. As shown in FIGS. 1 and 3, the side-strap structure comprises an outer strap shell 1, a strap 2, a middle strap shell 3, a bottom strap shell 4 and a strap locker 5.

Particularly, the bottom strap shell 4 is rotatably fixed to the main body 6 of the head-mounted device through the strap locker 5, the middle strap shell 3 is fixed between the outer strap shell 1 and the bottom strap shell 4, and one end of the strap 2 are fixed between the outer strap shell 1 and the middle strap shell 3. In general, two side-strap structures need to be provided at the head-mounted device, and are provided on the two sides of the head-mounted device for fixing the two ends of the strap to the head-mounted device.

An accommodating slot for placing a loudspeaker 8 is provided on the inner side of one end of the bottom strap shell 4. After the loudspeaker is placed into the accommodating slot, the middle strap shell 3 and the bottom strap shell 4 are hermetically connected. The middle strap shell 3, the bottom strap shell 4 and the upper end of the loudspeaker 8 form a front sound cavity of the loudspeaker 8. The middle strap shell 3 can also separate the front sound cavity of the loudspeaker 8 from the strap 2 so as not to affect the sound quality of the loudspeaker 8.

The outer side of the other end of the bottom strap shell 4 is provided with a sound emitting hole 7 of the loudspeaker 8, the sound emitting hole 7 is in communication with the front sound cavity, and the sound generated by the vibration of the loudspeaker 8 passes through the front sound cavity and the sound emitting hole 7 in sequence to realize external sound playing. The sound emitting hole 7 may be crescent, circular or oval. In addition, the sound emitting hole 7 may be one hole or the combination of a plurality of holes.

In conclusion, in the side-strap structure according to the present embodiment, one end of the strap is fixed between the outer strap shell and the middle strap shell, and the accommodating slot for placing the loudspeaker is provided on the inner side of one end of the bottom strap shell. After the loudspeaker is placed into the accommodating slot, the middle strap shell is hermetically connected to the bottom strap shell. The sound emitting hole of the loudspeaker is provided on the outer side of the other end of the bottom strap shell. Therefore, the side-strap structure does not only have the function of a strap for a head-mounted device, but also has the function of external sound playing. Moreover, it is compact in structure and small in volume.

Figure 7:
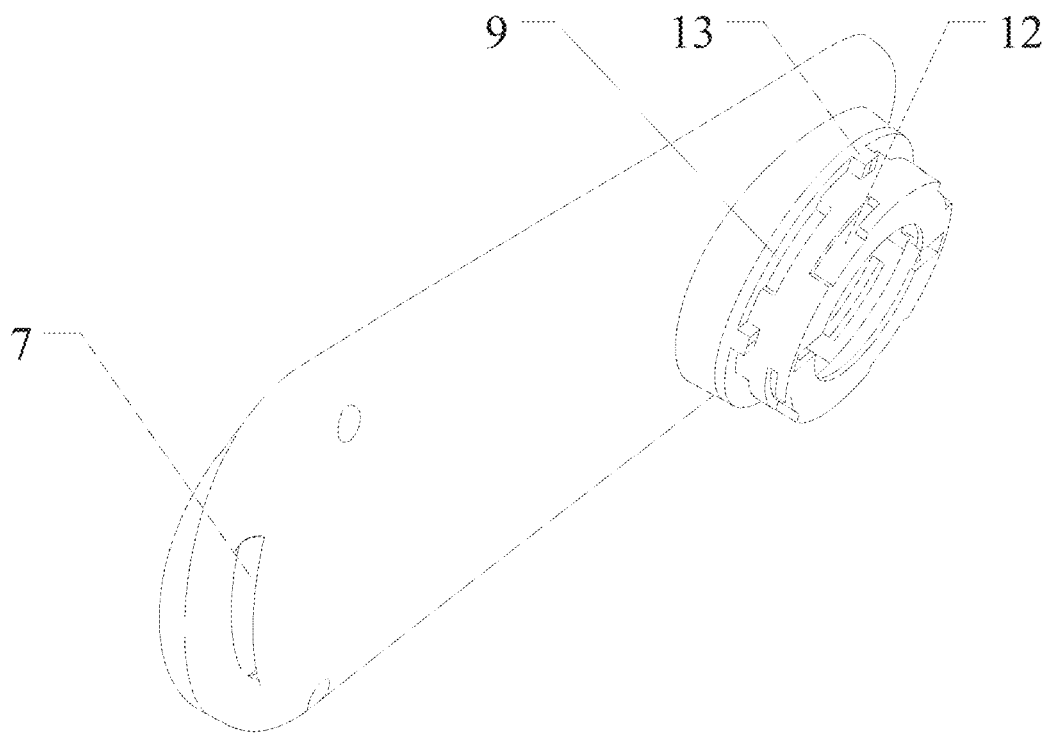
FIG. 7 is a perspective structural view of a bottom strap shell according to an embodiment of the present disclosure.

In an embodiment, in order to improve the sound quality of the loudspeaker 8, a rear sound cavity of the loudspeaker 8 is formed between the lower end of the loudspeaker 8 and the bottom of the accommodating slot. As shown in FIG. 7, a sound playing hole 9 is provided at the periphery of the accommodating slot so that the rear sound cavity of the loudspeaker 8 is in communication with the outside. Generally, when designing the structure of loudspeakers, it is necessary to provide a large front sound cavity and a large rear sound cavity to ensure that the air pressures at the front and rear end faces of the loudspeaker are equal during the vibration, to make the sound quality of the loudspeaker better. In the present embodiment, the rear sound cavity of the loudspeaker 8 is in communication with the outside by providing the sound playing hole 9 on the periphery of the accommodating slot, and thus the consistence of the air pressures of the front and rear sound cavities can be achieved without providing a large rear sound cavity, thereby reducing the volume of the side-strap structure.

In order to prevent external dust particles from entering the side-strap structure, a filter mesh is provided within the sound playing hole 9 and/or the sound emitting hole 7.

Figure 2:
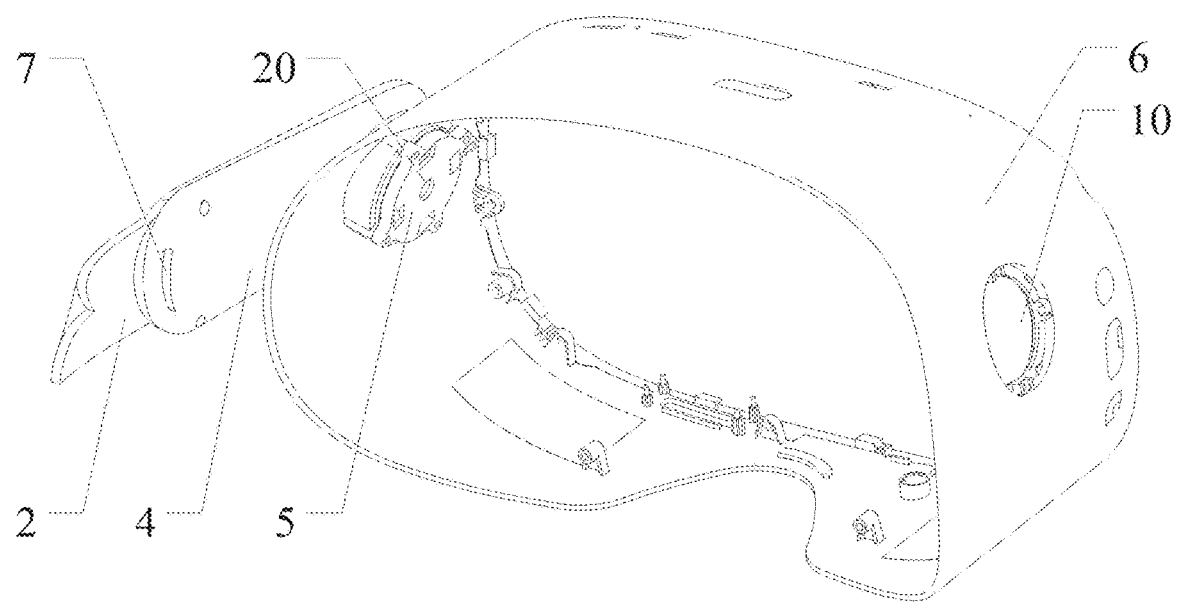
FIG. 2 is a perspective structural view of a side-strap structure according to an embodiment of the present disclosure.

In an embodiment, as shown in FIGS. 1-3, the accommodating slot is of an outwardly convex structure, and the bottom of the accommodating slot passes through a through hole 10 on a side of the main body 6 of the head-mounted device and is rotatably fixed to the strap locker 5. After the side-strap structure is assembled with the main body 6 of the head-mounted device, the main body of the accommodating slot is placed at the through hole 10, which effectively reduces the space occupation of the side-strap structure. In order to increase the strength of the through hole 10 on the side of the main body 6 of the head-mounted device, a reinforcing edge may be provided at the outer edge of the through hole 10.

Figure 6:
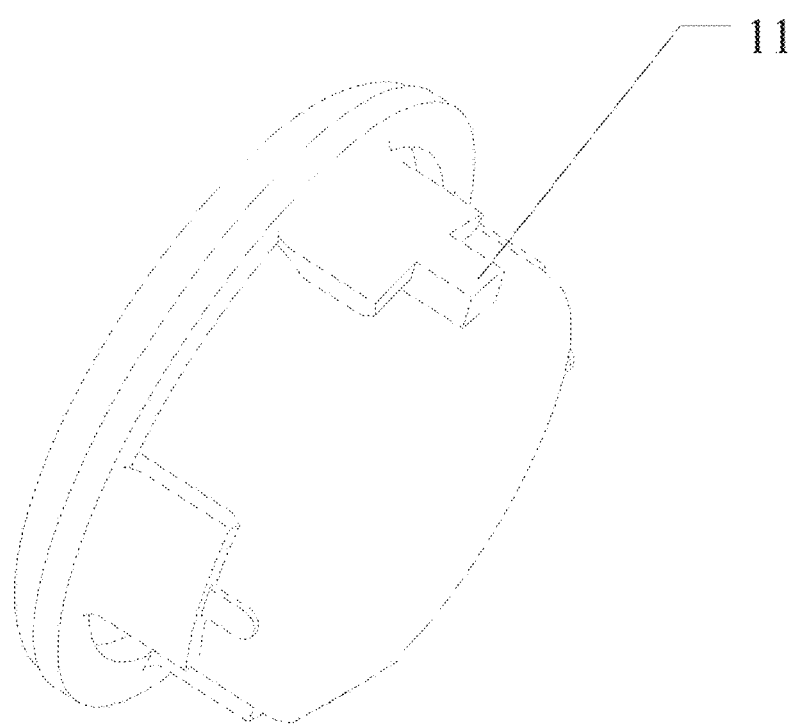
FIG. 6 is a perspective structural view of a loudspeaker according to an embodiment of the present disclosure.

Preferably, as shown in FIGS. 1 and 6, the cross section of the accommodating slot is circular, to place the loudspeaker 8 having a circular circumference. The loudspeaker 8 having a circular circumference has a good sound directivity and a good sound quality. Of course, the loudspeaker 8 and the accommodating slot may also be configured to be of other shapes, such as square or rectangular.

The inner wall of the accommodating slot is provided with a first anti-rotation slot, and the outer circumference of the loudspeaker 8 is provided with a first anti-rotation projection 11 matching with the first anti-rotation slot, thereby preventing the loudspeaker 8 from rotating in the accommodating slot.

In an embodiment, as shown in FIG. 7, a plurality of L-shaped rotary fixing grooves 12 are evenly provided at the outer circumference of the bottom of the accommodating slot, the strap locker 5 is provided with rotation fixing blocks matching with the rotary fixing grooves 12, and the strap locker 5 is fixed to the bottom strap shell 4 through the rotatably fixed engagement of the rotary fixing grooves 12 and the rotation fixing blocks.

In a preferable embodiment, as shown in FIG. 7, a plurality of second anti-rotation projections 13 are provided at the outer circumference of the accommodating slot, and second anti-rotation slots matching with the second anti-rotation projections 13 are provided at the outer edge of the through hole 10 on the side of the main body 6 of the head-mounted device. The design of the second anti-rotation projections 13 and the second anti-rotation slots can realize the position limiting assembling of the bottom strap shell 4 and the main body 6 of the head-mounted device, and also serves for anti-rotation after the assembling.

Figure 5:
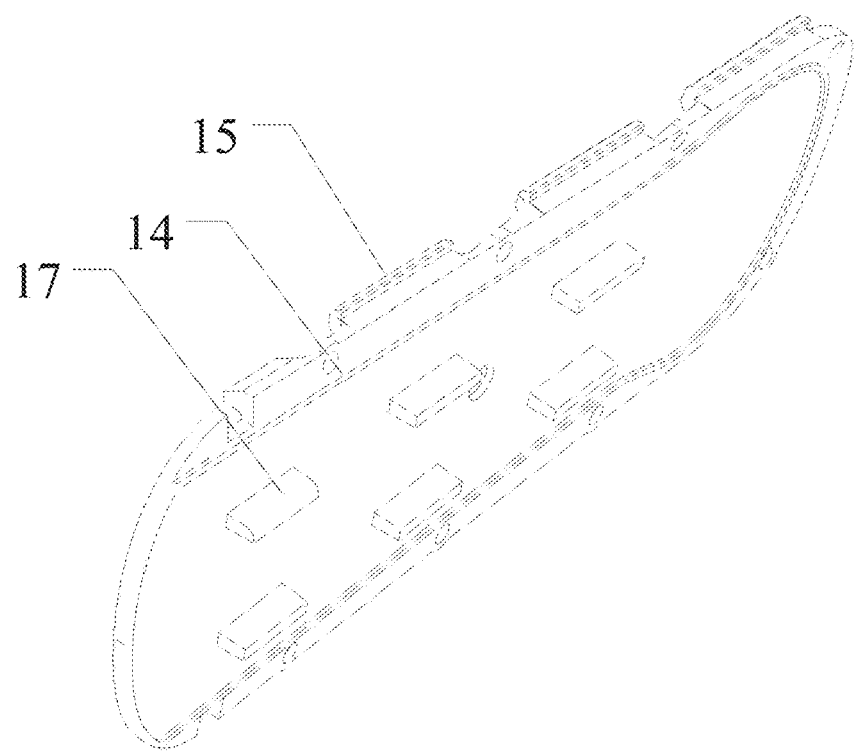
FIG. 5 is a perspective structural view of a middle strap shell according to an embodiment of the present disclosure.

In an embodiment, as shown in FIG. 5, a gluing slot is provided at the outer edge of the inner side of the bottom strap shell 4, and a gluing rib 14 is provided on the side of the middle strap shell 3 that is closer to the bottom strap shell 4. When the bottom strap shell 4 and the middle strap shell 3 are being assembled, the glue is dipped into the gluing slot firstly, and then the gluing rib 14 is put into the gluing slot correspondingly. The gluing slot and the gluing rib 14 may be one whole segment or a plurality of segments.

A plurality of fixing ribs 15 are provided at the outer edge of the middle strap shell 3, and fixing grooves 16 matching with the fixing ribs 15 are provided on the inner side of the outer strap shell 1. When the middle strap shell 3 is being assembled with the outer strap shell 1, the fixing ribs 15 are correspondingly clamped into the fixing grooves 16.

In the present embodiment, by designing the fixing structures between the outer strap shell 1, the middle strap shell 3 and the bottom strap shell 4, the outer edge of the bottom strap shell 4 is slightly smaller than the outer edge of the middle strap shell 3, and the outer edge of the middle strap shell 3 is slightly smaller than the outer edge of the outer strap shell 1. In this way, the bottom strap shell 4 can be designed smaller, thereby reducing the overall volume of the side-strap structure.

In order to strengthen the fixation between the outer strap shell 1, the middle strap shell 3 and the bottom strap shell 4, threaded holes may be provided at the outer strap shell 1, the middle strap shell 3 and the bottom strap shell 4. After fixing and assembling them through the above structure, they can be further fixed through screws and the threaded holes.

Figure 4:
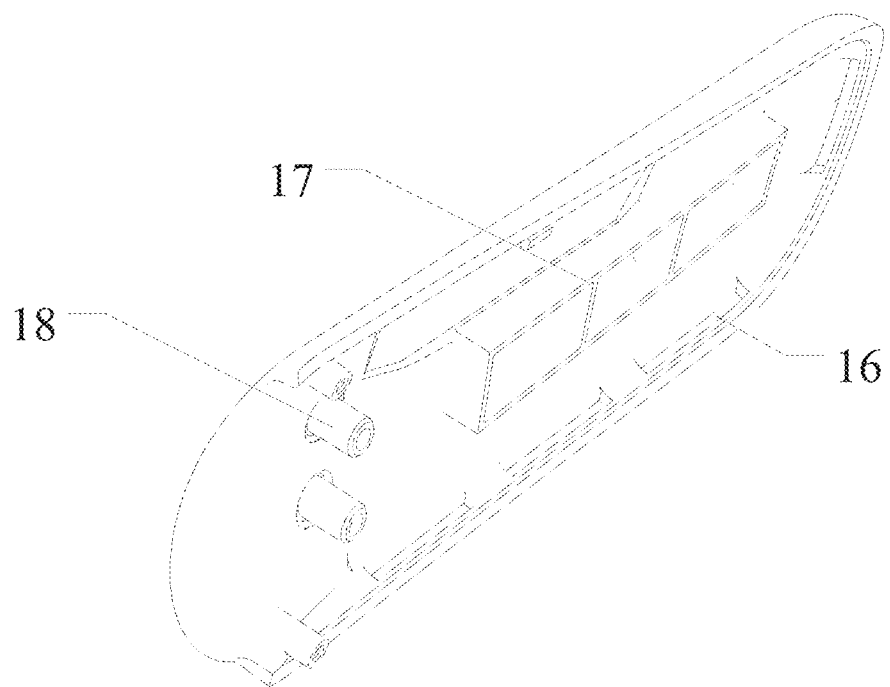
FIG. 4 is a perspective structural view of an outer strap shell according to an embodiment of the present disclosure.

Preferably, as shown in FIGS. 1 and 4-5, a supporting structure 17 is provided on both of the side of the middle strap shell 3 that is closer to the bottom strap shell 4 and the side of the outer strap shell 1 that is closer to the middle strap shell 3. The supporting structure 17 plays a supporting role, and also prevents the loudspeaker 8 from driving the middle strap shell 3 to vibrate during the vibration, which affects the sound quality.

The supporting structure 17 may be a plurality of supporting blocks, supporting columns and/or supporting slots.

In an embodiment, in order to make the overall structure more beautiful, the outer strap shell 1, the middle strap shell 3 and the bottom strap shell 4 have oblong shapes with similar structures.

Moreover, all of the outer strap shell 1, the middle strap shell 3 and the bottom strap shell 4 have a part curving towards the main body 6 of the head-mounted device, so as to make the sound emitting hole 7 close to an ear of the user, to make the sound clearer.

In an embodiment, as shown in FIG. 4, the inner surface of the outer strap shell 1 is provided with a screw column 18, and the strap 2 is fixed to the outer strap shell 1 through the screw column 18 and a screw or bolt to realize the fixed connection between the strap 2 and the outer strap shell 1. Of course, they may also be fixed by other means, such as bonding or clamping.

Figure 8:
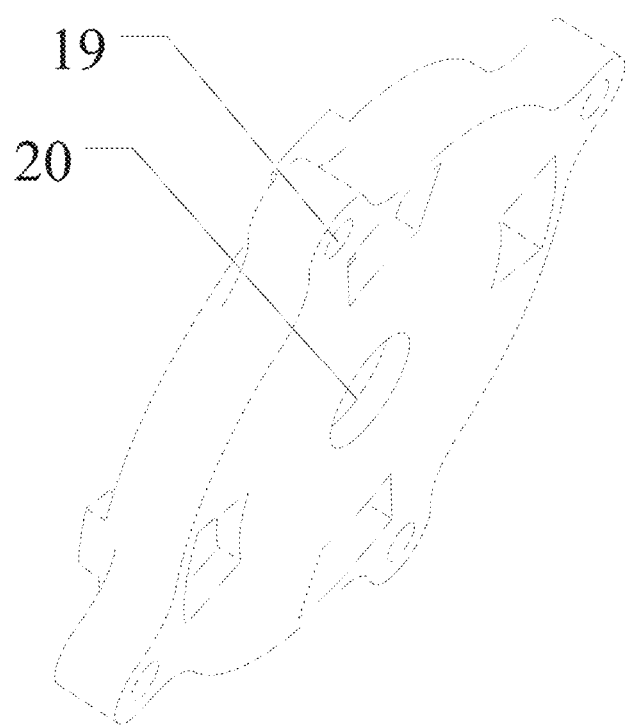
FIG. 8 is a perspective structural view of a strap locker according to an embodiment of the present disclosure.

As shown in FIG. 8, a plurality of screw holes 19 are evenly provided at the strap locker 5. The strap locker 5 is fixedly connected to the main body 6 of the head-mounted device through the screw holes 19 and screws or bolts. After the strap locker 5 is rotatably fixed to the bottom strap shell 4, it is fixed to the main body 6 of the head-mounted device through the screw holes 19. A wire-harness hole 20 is provided at the center of the strap locker 5, and the wire harness of the loudspeaker 8 enters the interior of the main body 6 of the head-mounted device through the wire-harness hole 20.

The above are merely particular embodiments of the present disclosure. By the teaching of the present disclosure, a person skilled in the art can make other modifications or variations on the basis of the above embodiments. A person skilled in the art should understand that the above particular descriptions are only for the purpose of better interpreting the present disclosure, and the protection scope of the present disclosure should be subject to the protection scope of the claims.

What is claimed is:

1. A side-strap structure for a head-mounted device, comprising an outer strap shell, a strap, a middle strap shell, a bottom strap shell and a strap locker;
    the bottom strap shell is rotatably fixed to a main body of the head-mounted device through the strap locker, the middle strap shell is fixed between the outer strap shell and the bottom strap shell, and one end of the strap is fixed between the outer strap shell and the middle strap shell; and
    an accommodating slot for placing a loudspeaker is provided on an inner side of one end of the bottom strap shell, the middle strap shell is hermetically connected to the bottom strap shell after the loudspeaker is placed into the accommodating slot, and a sound emitting hole of the loudspeaker is provided on an outer side of the other end of the bottom strap shell;
    wherein the accommodating slot is of an outwardly convex structure, and a bottom of the accommodating slot passes through a through hole on a side of the main body of the head-mounted device and is rotatably fixed to the strap locker.

2. The side-strap structure according to claim 1, wherein a sound playing hole is provided at a periphery of the accommodating slot; and
    a filter mesh is provided inside the sound playing hole and/or the sound emitting hole.

3. The side-strap structure according to claim 1, wherein a cross section of the accommodating slot is circular and is for placing the loudspeaker having a circular circumference; and
    an inner wall of the accommodating slot is provided with a first anti-rotation slot, and the outer circumference of the loudspeaker is provided with a first anti-rotation projection matching with the first anti-rotation slot.

4. The side-strap structure according to claim 3, wherein a plurality of L-shaped rotary fixing grooves are evenly provided at an outer circumference of a bottom of the accommodating slot, and the strap locker is provided with rotation fixing blocks matching with the rotary fixing grooves.

5. The side-strap structure according to claim 3, wherein a plurality of second anti-rotation projections are provided at an outer circumference of the accommodating slot, and second anti-rotation slots matching with the second anti-rotation projections are provided at an outer edge of a through hole on a side of the main body of the head-mounted device.

6. The side-strap structure according to claim 1, wherein a gluing slot is provided at an outer edge of an inner side of the bottom strap shell, and a gluing rib is provided on one side of the middle strap shell that is closer to the bottom strap shell; and a plurality of fixing ribs are provided at an outer edge of the middle strap shell, and fixing grooves matching with the fixing ribs are provided on an inner side of the outer strap shell.

7. The side-strap structure according to claim 1, wherein both of one side of the middle strap shell that is closer to the bottom strap shell and one side of the outer strap shell that is closer to the middle strap shell are provided with a supporting structure.

8. The side-strap structure according to claim 1, wherein the outer strap shell, the middle strap shell and the bottom strap shell have oblong shapes with similar structures; and all of the outer strap shell, the middle strap shell and the bottom strap shell have a part curving towards the main body of the head-mounted device so as to make the sound emitting hole close to an ear of a user.

9. The side-strap structure according to claim 1, wherein an inner surface of the outer strap shell is provided with a screw column, and the strap is fixed to the outer strap shell by the screw column and a screw or bolt; and a plurality of screw holes are evenly provided at the strap locker, and the strap locker is fixedly connected to the main body of the head-mounted device by the screw holes and screws or bolts.

\* \* \* \* \*